(12) United States Patent
Bohrer et al.

(10) Patent No.: US 6,975,958 B2
(45) Date of Patent: Dec. 13, 2005

(54) PROFILE BASED METHOD FOR DERIVING A TEMPERATURE SETPOINT USING A 'DELTA' BASED ON CROSS-INDEXING A RECEIVED PRICE-POINT LEVEL SIGNAL

(75) Inventors: Philip J. Bohrer, Edina, MN (US); Gregory J. Merten, Eagan, MN (US); Robert J. Schnell, Plymouth, MN (US); Michael B. Atlass, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 8 days.

(21) Appl. No.: 10/426,760

(22) Filed: Apr. 30, 2003

(65) Prior Publication Data

US 2003/0187549 A1 Oct. 2, 2003

Related U.S. Application Data

(63) Continuation of application No. 08/329,129, filed on Oct. 25, 1994, now Pat. No. 6,574,581.

(51) Int. Cl.[7] .............................................. G01K 17/00
(52) U.S. Cl. .................... 702/130; 702/60; 700/286; 705/412
(58) Field of Search .................. 702/130, 60; 700/286, 700/295; 705/412; 340/310.01, 870.02, 870.05, 870.29, 870.03, 825.52

(56) References Cited

U.S. PATENT DOCUMENTS

| | | |
|---|---|---|
| 3,656,112 A | 4/1972 | Paul |
| 3,900,842 A | 8/1975 | Calabro et al. |
| 4,357,665 A | 11/1982 | Korff |
| 4,399,510 A | 8/1983 | Hicks |
| 4,429,299 A | 1/1984 | Kabat et al. |
| 4,510,398 A | 4/1985 | Culp et al. |
| 4,511,979 A | 4/1985 | Amirante |
| 4,551,812 A | 11/1985 | Gurr et al. |
| 4,556,865 A | 12/1985 | Fukagawa et al. |
| 4,591,988 A | 5/1986 | Klima et al. |
| 4,608,560 A | 8/1986 | Allgood |
| 4,630,670 A | 12/1986 | Wellman et al. |
| 4,642,607 A | 2/1987 | Strom et al. |
| 4,742,475 A * | 5/1988 | Kaiser et al. ............... 700/278 |
| 4,771,185 A | 9/1988 | Feron et al. |
| 4,909,041 A * | 3/1990 | Jones .......................... 62/99 |
| 4,916,328 A * | 4/1990 | Culp, III ..................... 307/39 |
| 4,924,404 A * | 5/1990 | Reinke, Jr. .................. 705/412 |
| 5,003,457 A * | 3/1991 | Ikei et al. ..................... 700/4 |
| 5,153,837 A * | 10/1992 | Shaffer et al. ............. 705/412 |
| 5,270,952 A * | 12/1993 | Adams et al. ............. 700/278 |
| 5,289,362 A * | 2/1994 | Liebl et al. .................. 700/22 |
| 5,392,042 A * | 2/1995 | Pellon ........................ 341/143 |
| 5,395,042 A | 3/1995 | Rilley et al. |
| 5,802,467 A * | 9/1998 | Salazar et al. ............. 455/420 |

OTHER PUBLICATIONS

Reza S. Raji, "Smart Networks for Control," Jun. 1994, IEEE Spectrum, pp 49–55.

* cited by examiner

*Primary Examiner*—Bryan Bui
*Assistant Examiner*—Hien Vo
(74) *Attorney, Agent, or Firm*—Gregory Ansems

(57) ABSTRACT

A method for adjusting a plurality of controlled subsystems in a building or plant that facilitates cooperative energy usage with a utility provider. By referring to a single profile of adjustments that correspond to changes in the value of a utility signal and distributing this to each relevant controller for each subsystem, a single setback delta can be applied to each subsystem for each change in utility signal value (i.e., pricing information). Alternatively, multiple profiles can be used to provide for firmer control and thereby allow for different zones to respond differently to a single change signal sent by the utility provider.

40 Claims, 15 Drawing Sheets

PROFILE BASED METHOD FOR DERIVING A TEMPERATURE SETPOINT USING A 'DELTA' BASED ON CROSS-INDEXING A RECEIVED PRICE-POINT LEVEL SIGNAL

This is a continuation of application Ser. No. 08/329,129 filed on Oct. 25, 1994, now U.S. Pat. No. 6,574,581, entitled "Profile Based Method for Deriving A Temperature Setpoint Using a 'Delta' based on cross-indexing a Receive Price-Point Level Signal.

This invention relates to reducing energy costs (in conjunction with time-of-use pricing with rates that vary according to energy costs) and has particular application to home control and building control in general and is useful in areas supplied by electric utilities that wish to engage in demand side management of their area.

BACKGROUND OF THE INVENTION

As it becomes more expensive for electricity providers to increase generation, distribution and transmission capacity, a number of strategies for coping with increasing electrical demand have emerged. One of these is called demand side management in which the users of electricity themselves are adapted to reduce the amount of electricity they use during times of peak power usage as well as in other similar situations. The invention herein provides a way to adapt users of electricity to reduce their demand responsive both to predetermined rate information established periodically by the local utility and to real time changes in rates. Thus by communicating the (time-of-use) energy price rate to a control system within the customer's premises, the control system can reduce the energy consumption within the premise during times when the cost of energy is high. The utility can reduce the necessary generating capacity for a given area, and the users of that power can reduce their cost of buying it at the same time.

Previous ways to deal with related problems of reducing energy consumption in buildings in general are described in U.S. Pat. Nos. 4,510,398; 4,916,328 and 4,909,041. Nevertheless there is no reason why this invention could not be used in non-residential buildings or even in industrial processes that consume electric power.

BRIEF DESCRIPTION OF THE DRAWINGS

FIGS. 4b–r (there is no FIG. 4j) are ordered sets of displays in accord with a preferred embodiment of this invention available to the user through the display illustrated in FIG. 4a.

SUMMARY OF THE INVENTION

A controller for controlling the energy-consuming equipment and systems in a building which may benefit from changing utility rate information is taught in this invention. In a memory, the controller stores price point profiles that contain information indicating the appropriate setpoint-delta, or setpoint limit for each system under control by the controller for each price point. A price point may be called a tier, a rate change or rate, or a critical change, depending on an agreed-upon or established convention for the utility. Some of this information may change over the course of a day or week, and some may be real-time driven by signals provided by the utility service provider. In the main, this invention is concerned with the last mentioned kind of price change information but does also accommodate others.

A processor is connected to produce adjusted setpoint signals or adjust the setpoint for each of the controlled subsystems. All the changes will occur based on the predetermined information located in the pricing profiles stored in memory.

The controller has a gateway for communicating the pricing point signals to the controller from the utility. A significant amount of variability is available to the designer employing the invention described herein, which should only be considered limited by the claims.

DETAILED DESCRIPTION OF THE PREFERRED EMBODIMENT

Figure 1:
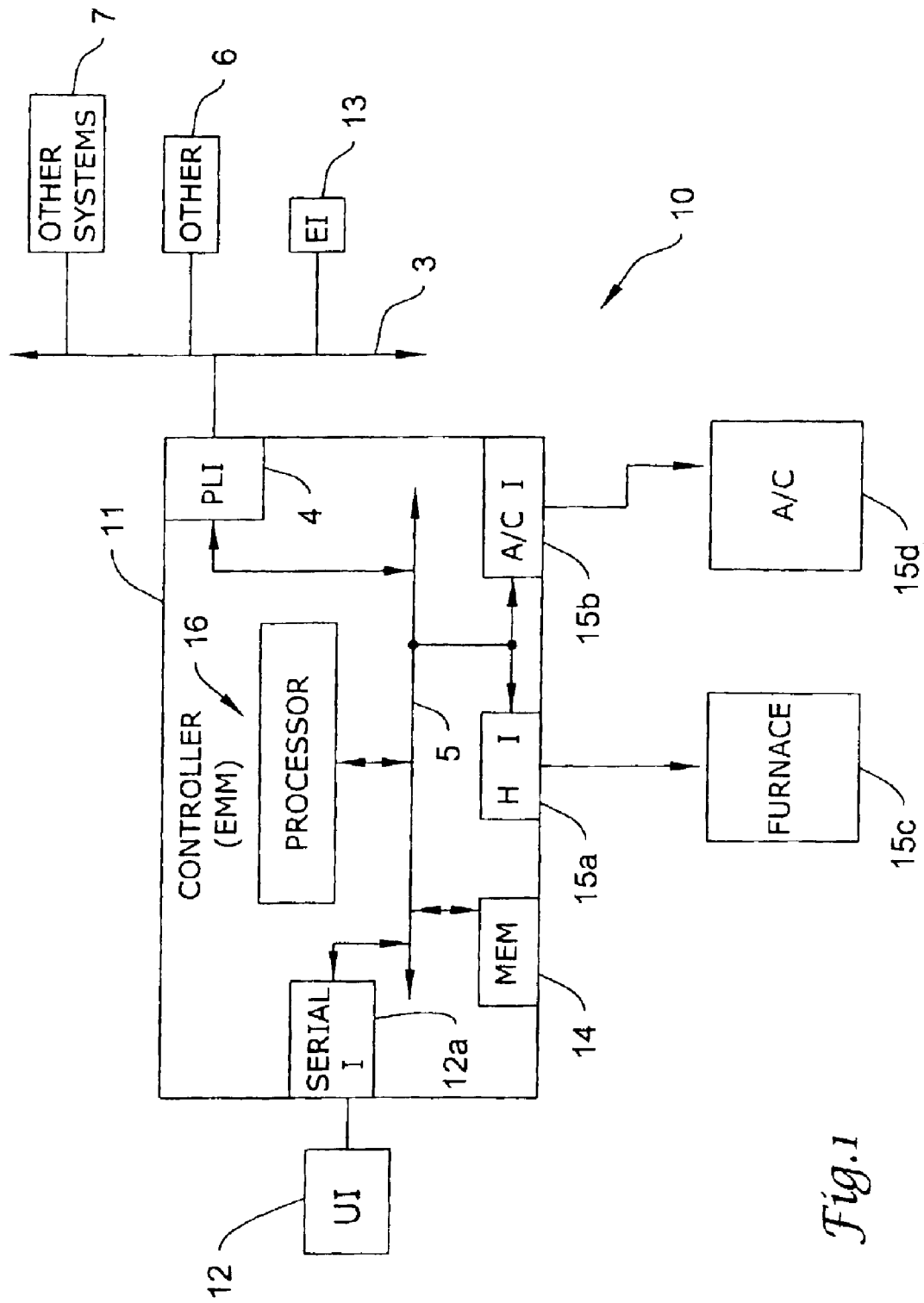
FIG. 1 is a conceptual block diagram of one form of the preferred embodiment of the invention.

FIG. 1 describes the control system 10 consisting of a controller 11 which, in the preferred embodiment is organized to include a user interface 12, memory subsystem 14, heating plant interface 15a, air conditioner interface 15b and power line interface 4; each of which communicate with a processor 16, either through direct connections or via a controller bus 5. In the preferred embodiment, a communications interface to the utility (called an external interface) 13 is connected to the controller through power line interface 4. The controller 11 may send output signals heating plant 15a, air conditioner 15b, other systems 6 and 7, and the user interface 12 as desired by the user for controlling the various systems that are controlled by the controller 11.

A preferred bus structure for setting up the interfaces between the controller and the other components is described with reference to FIG. 1A. A number of companies currently provide a universal interface for home control, for example "H-Bus" (provided by Honeywell Inc.) which here could operate as controller bus 81. This bus would allow for communications between the various components attached to that bus of the various control and information signals and data which need to be passed the units at the system. The H-Bus™ system provided by Honeywell, for example, provides for a DC balanced, limited set of code words which all systems may read and which only appropriate systems will react to. Alternative forms of busses are well known and, as the art develops, new busses will become known and the most efficient bus for the appropriate situation should be employed by the designer. The external interface to the utility 86 in the preferred embodiment interfaces with a utility provided coaxial cable 84 although there are many ways the utility pricing signal could be fed into the system 8 (for example, RFI 86a could receive RF signals). Likewise, fiber-optic cable or the power lines themselves may be used if desired.

Figure 1A:
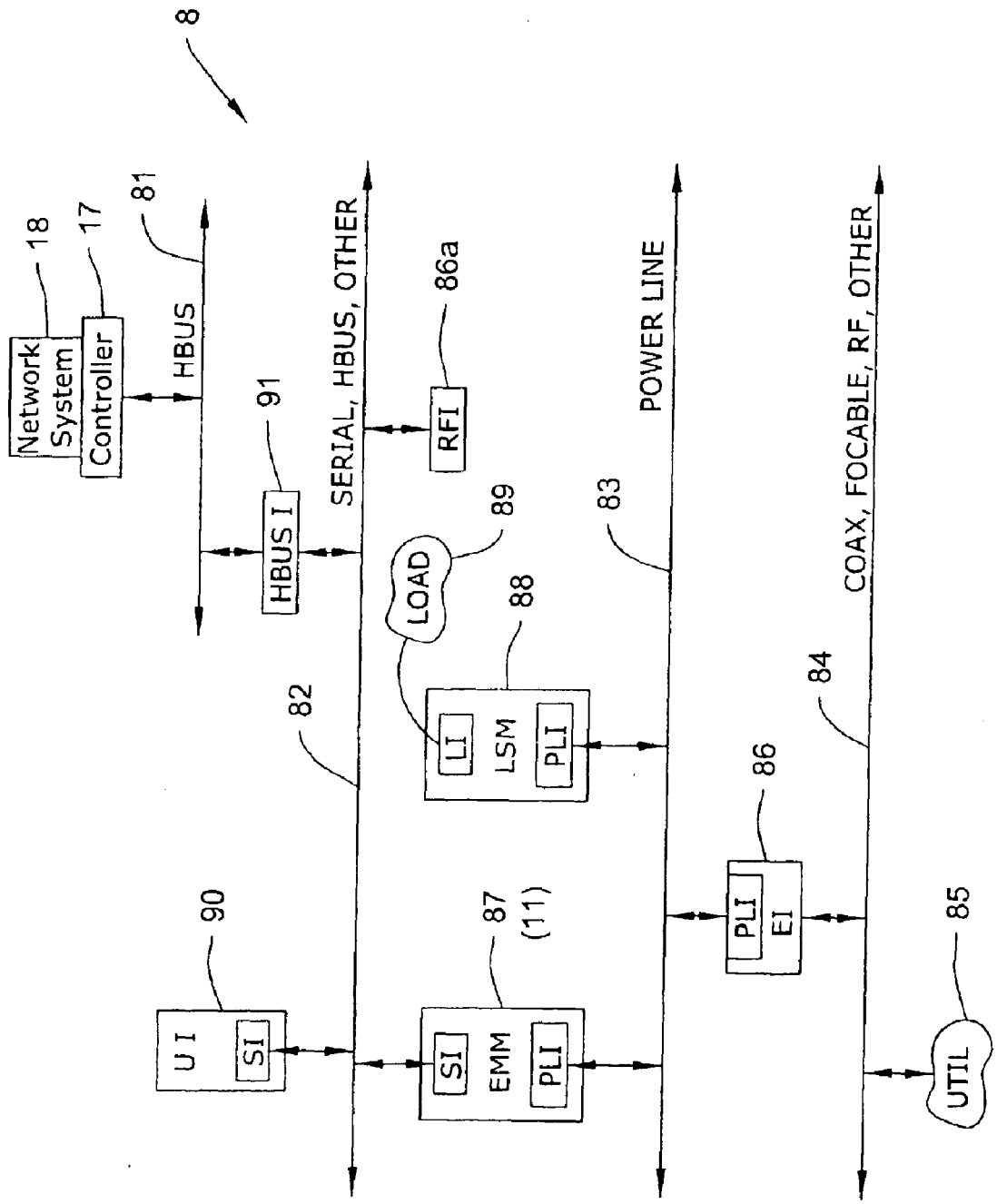
FIG. 1A is a conceptual block diagram of a preferred embodiment bus structure for the invention.

In the illustration of FIG. 1A, H-Bus™ interface 91 merely provides for communications between two busses, 81 and 82, where bus 82 may be, alternatively, another H-Bus™, or perhaps even a power line used as a bus. The bus 82 side of interface 91 will, of course, have to be adapted to the particular situation. In this situation, for example, controller 17 could connect directly to bus 82 i it were an H-Bus™, and interface 91 would not be needed.

In some embodiments this communication could be two-way, to also provide data back to the utility. Many different forms of external interface may be employed without going beyond the scope of this invention and these are described in more detail with reference to FIG. 2. The controller 87 (11) resides on both a serial bus 82 and on the power line which here is also used for communicating data. The user interface 12 preferably also resides on the same serial bus 82. A power line interface (PLI) (which may also be provided to all communicating systems on the power line) will, in the minimum configuration for using a power line interface, provide signals from the controller through the power line 83 to systems that function through power line controllers (for example, LSM controller module 88 which controls load 89). In the simplest case, a light (which might be load 89) could be turned on or off at various times of the day or according to various other factors taken into consideration by the controller 88. Many other configurations based on this example should be readily apparent to those of ordinary is skill in this art.

Figure 2:
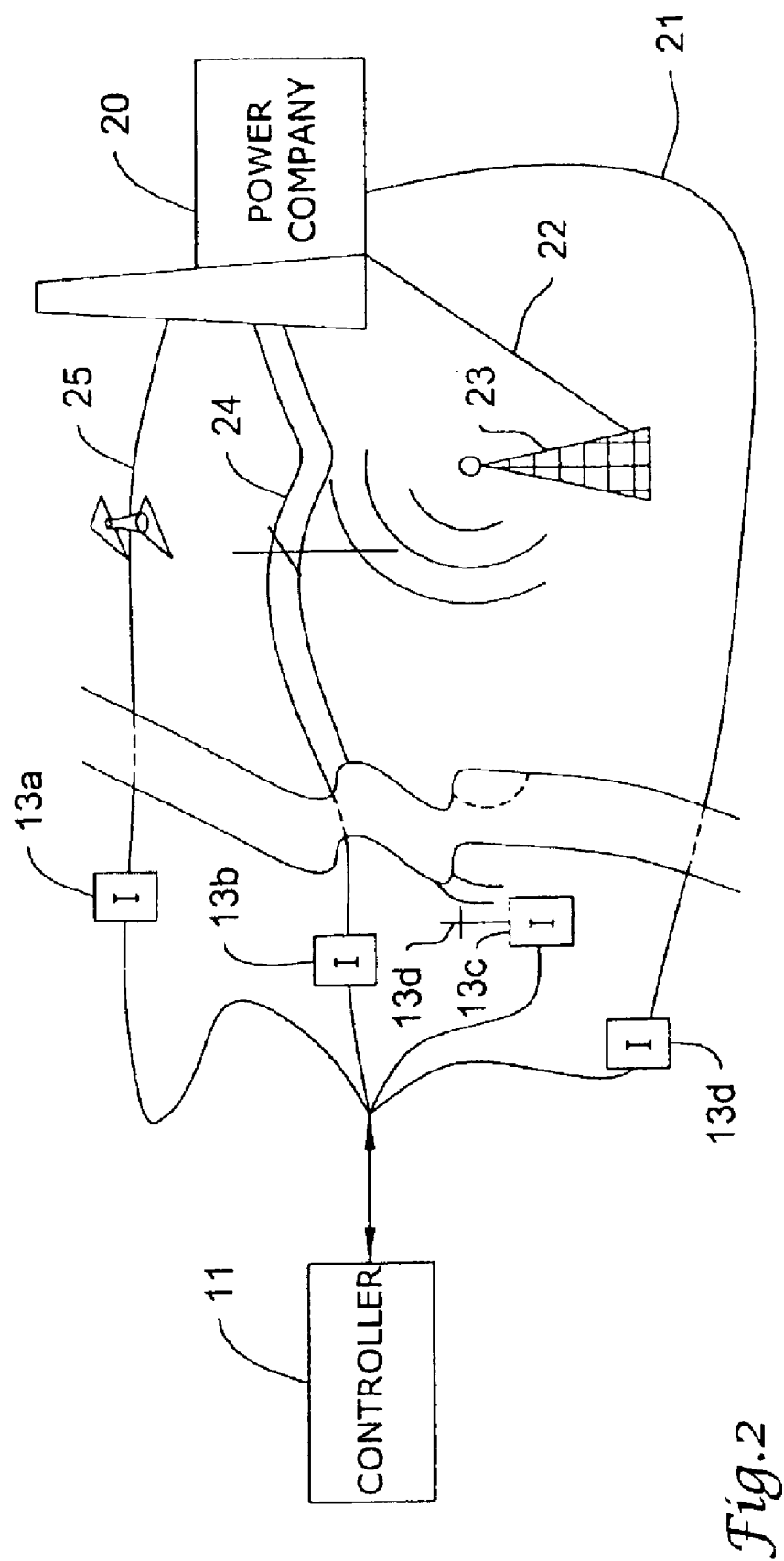
FIG. 2 is a conceptual block diagram of the power supplier's or company's interface to a controller in one preferred embodiment of the invention.

Referring now to FIG. 2, potential forms of interface from the power company 20 to the controller 11 are described. Each one of these has strengths and weaknesses which may be overcome by others. A telephone line 25 may connect an interface 13a to the controller in a house or in a building, for instance, or a direct line 21 may go directly to the interface box 13d which connects to the controller 11. If the power company opts to send signals through the power lines 24 themselves to interface box 13b, a number of problems may develop with the carrying of such signals through the transformer network currently employed by electric utility companies, for example. Some combination of power line and radio wave signals may be employed such as, for instance, having a radio receiver at every transformer in a locality wherein the radio receiver would send an appropriate signal over the power lines after the transformer into the individual's houses or buildings or, a small area may be blanketed in which each house has a box 13c with an antenna 13d which receives RF signals from an output antenna 23 from the power company on line 22. As with the previous two diagrams, many combinations of the above will occur to the designer of ordinary skill in the art without leaving the scope of this invention. In the presently preferred embodiment, the utility signals the user's facility/home/building via a coaxial cable. This signal is transferred into the facility's internal power lines, where a power line interface receives the signals.

In general, any value laden signal could be called a "tier" signal. So, for example, if the utility provider sent signals corresponding to real-time price data, the processor would have to be modified to respond to such data rather than to a "tier" level signal. It is presently felt that the simplicity provided by using a limited number of tier signals affords use of simpler processors and for that reason it is present preferred. The practitioner of ordinary skill can easily adapt this invention to any type of consistent signaling mechanism.

Figure 3:
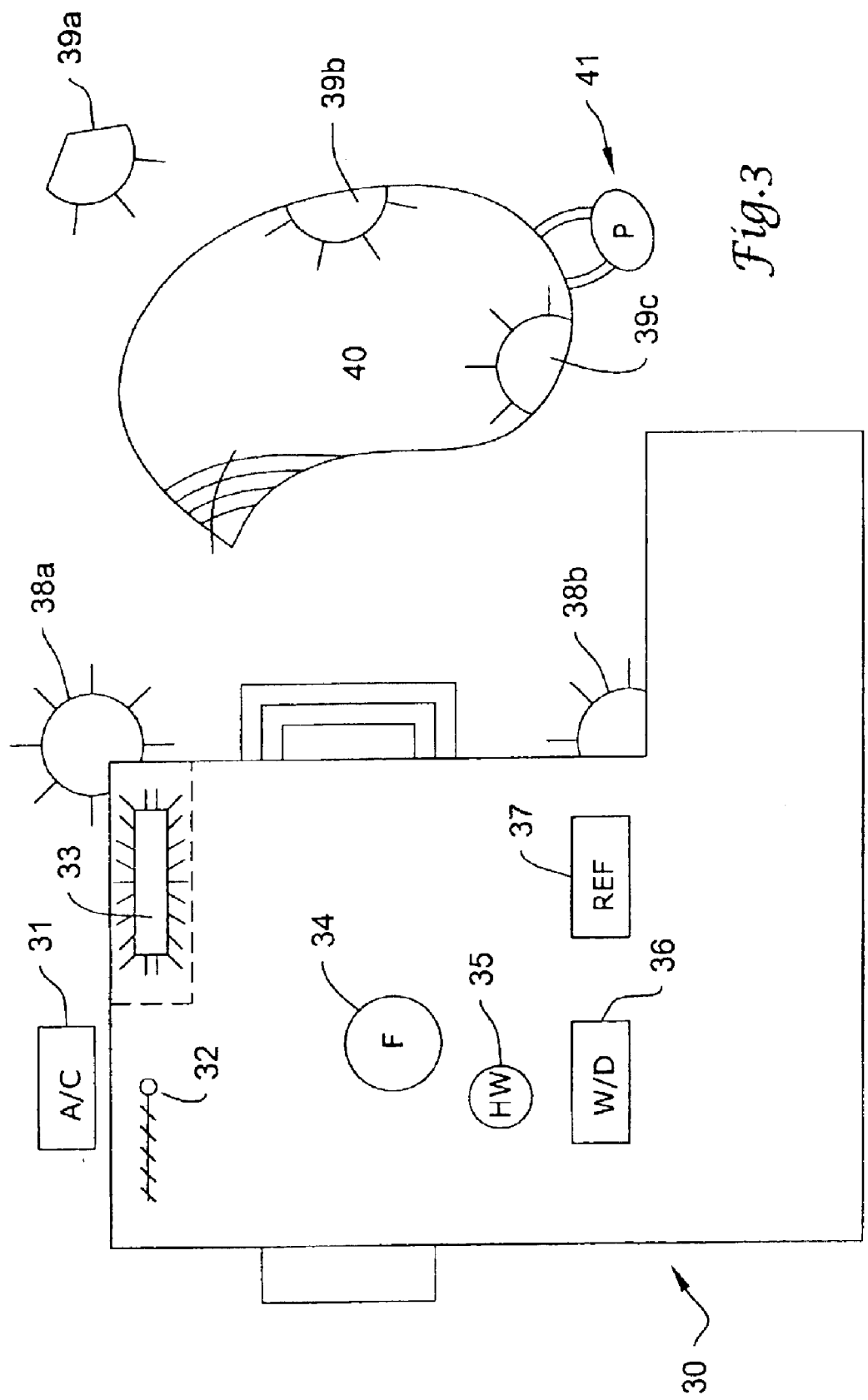
FIG. 3 is a two-dimensional overview diagram of a house which may be employed having a number of systems controllable in accord with one of the preferred embodiments of the invention.

FIG. 3 has a collapsed floor plan of a house 30 and pool 40 showing various subsystems 31–39 and 41, which are controllable through the use of this invention. The air conditioning subsystem 31 and the furnace or heating subsystem (preferably electric) 34 generally will work together through a thermostat (not shown). In sophisticated houses a vertical blind turning motor 32 could be provided to reduce heat load or increase heat load provided by the sun on rooms in a building through a window. Various lighting subsystems may be controlled individually such as plant lights 33 in an arboretum, exterior security lights 38a and 38c and exterior pool lights 39a–c. A hot water heater 35, washer/dryer 36, refrigerator 37 and pool pump 41 provide other examples of subsystems which may be controlled by use of this invention. By quickly referring back to FIG. 2, it can easily be seen that various controller interfaces such as 13a, 15d, 13b and 16 may be employed for controlling these subsystems of the user's homes.

For example, the security light system 38a and 38b may be turned on at all times during the evening hours, regardless of cost, in a high-crime neighborhood. Likewise, beyond a certain price tier or level, the pool pump subsystem 41 and outdoor pool lights 39a–c would likely be turned off any time price of power for them reaches a certain tier. As would occur to the reader, there may be times that an owner/occupier of a building space would prefer to override a standard program and this can be included as well.

Some systems of the typical house however, will preferably have their setpoints adjusted rather than either being simply turned on or off based on the price point provided by a utility. The most common example currently would be the heating and air conditioning system in the typical residential home or commercial building. Typically, setback thermostats have become well distributed within the United States and are well known elsewhere. These thermostats allow for programming by the occupant to accommodate his schedule. The simplest version would have two modes or periods, a high and a low, but most have at least four. These have been called various things but commonly may be referred to as period: WAKE, LEAVE, RETURN and SLEEP, which may roughly be interpreted as warm up the house in the winter because the occupant is waking, the occupant is leaving so reduce power consumption for maintaining the comfort in a space, the occupant is returning and wants a higher level of comfort, and the occupant expects to be asleep and therefore a different temperature and comfort level is required. An exemplary unit is produced by Honeywell Inc. and goes by the trademark "Magicstat™", and provides these four modes for the occupant to program.

The invention herein, with reference to this subsystem of heating, ventilation and air conditioning control may operate at various levels of complexity depending upon the subsystems and controllers available in the house or building. In general, it may function in one of two ways. First, it may require a list of setpoints for each controlled subsystem (furnace, air conditioner, lighting systems, refrigerator cycling time, etc.) for each price point or tier which the utility may provide. Second, it may simply maintain a list of offsets for each price-point.

Figure 5:
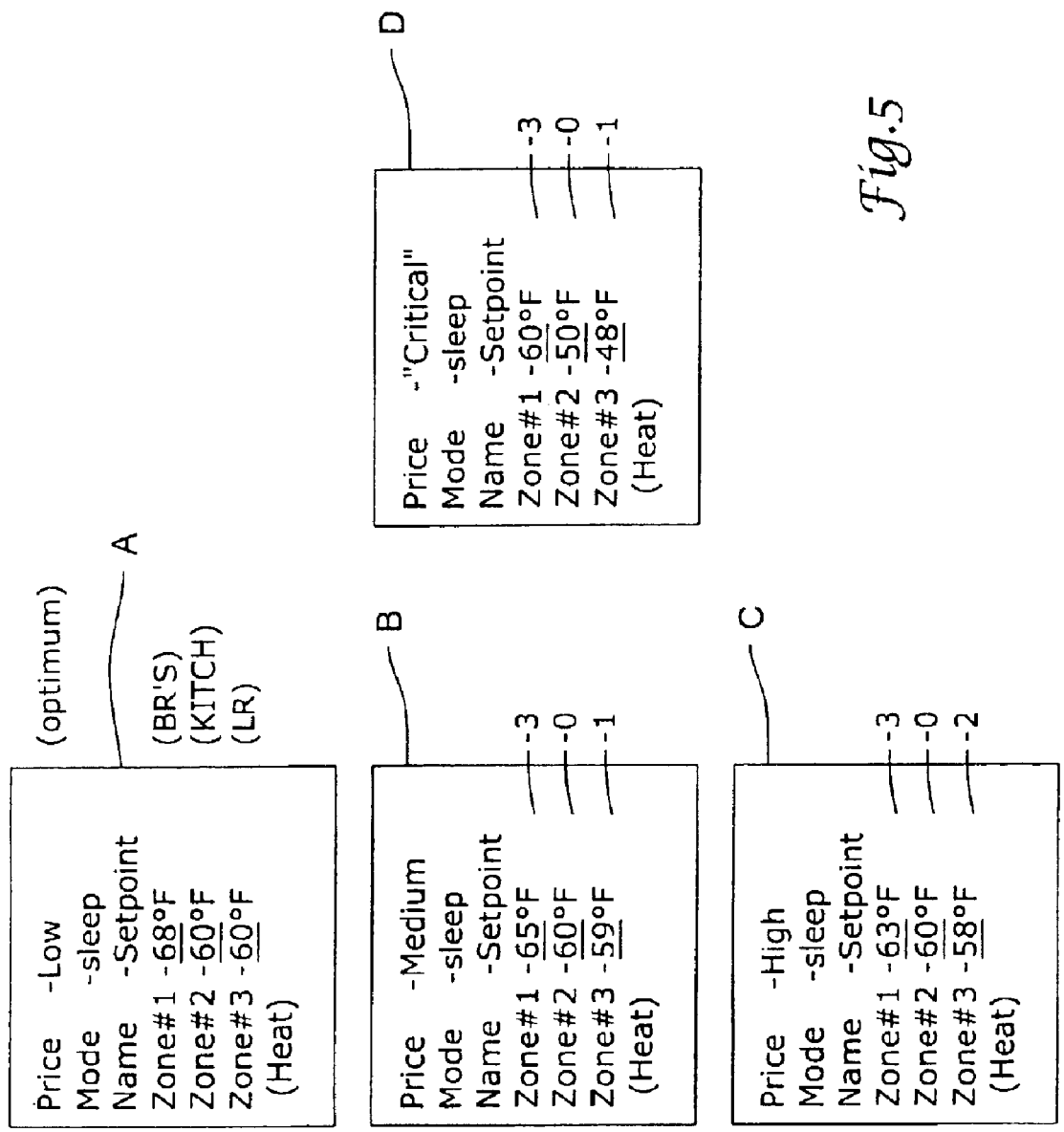
FIG. 5 is a partial example profile list representing a heating system for use in a house in accord with a preferred embodiment of this invention.

For the example of the first, refer to FIG. 5 in which the profiles for four levels; A, B, C and D corresponding to low price, medium price, high price and critical are shown for the furnace. For purposes of explanation, assume this is electric furnace 34 and air conditioner 31 in house 30 of FIG. 3. Zone 1 may be the bedrooms. For user convenience, it may be called "Master BR" or some other mnemonic chosen by the user. Zone 2 may be the kitchen and zone 3 may be the dining room area. Each one of these profiles A–D should exist for each mode available to the user. In those illustrated in FIG. 5, the sleep mode is the only mode indicated. Thus, if the occupant expects to be sleeping, the temperature preferred for the bedroom at the lowest price point available from the utility (Price-Low) would be 68° for the bedrooms in this user's most desirable comfort. The kitchen and living room are not being occupied and therefore a cooler temperature may be perfectly all right for this user, 60° Fahrenheit for zones 2 and 3, respectively. This example assumes wintertime weather in which the outdoor air temperature is, perhaps, 20° Fahrenheit. Profile B shows the setpoints for the heater in the sleep mode at the medium tier price. Profile C shows the three-zone setpoints in the sleep mode at the high price point. If the utility provider so desires and there are peak demand periods which must be dealt with and users who don't deal with them through this demand-side management must pay an exorbitant price may be summarized in the profile critical—D, which in the sleep mode allows the bedrooms to reach 60° Fahrenheit and the living room and dining room area to reach 48° Fahrenheit. If a critical tier is employed by the utility provider, it may specify the setpoints itself.

Figure 6:
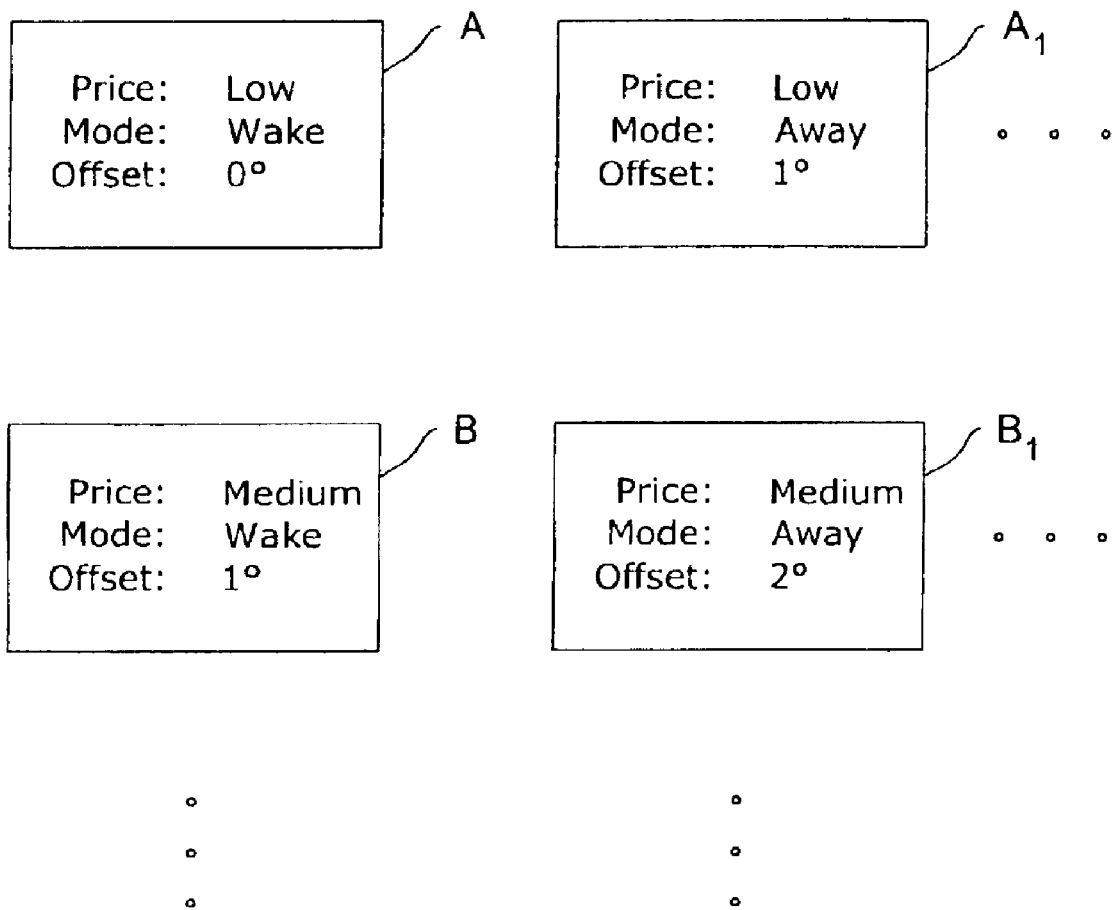
FIG. 6 is another preferred embodiment profile list.

For an example of the second method of profile usage, see FIG. 6 in which again a partial layout of profile (here A, B, $A_1$ and $B_1$) is shown to demonstrate the concept employed here. FIG. 6 contains two mode partial profile sets; A, B for a "WAKE" mode and $A_1$, $B_1$, to contain the information for the first two price levels for the "AWAY" mode. In this second method, note that a single offset is applied to the entire set of subsystems affected.

It is anticipated that this might, in the ordinary homestead, be limited to one or two subsystems, i.e., the HVAC and perhaps the hot water heater. In such cases where the first applications of this invention are likely to be found, it seems most advantageous not to add the memory to hold different offsets for different zones. Accordingly, this is the presently preferred embodiment.

Figure 4A:
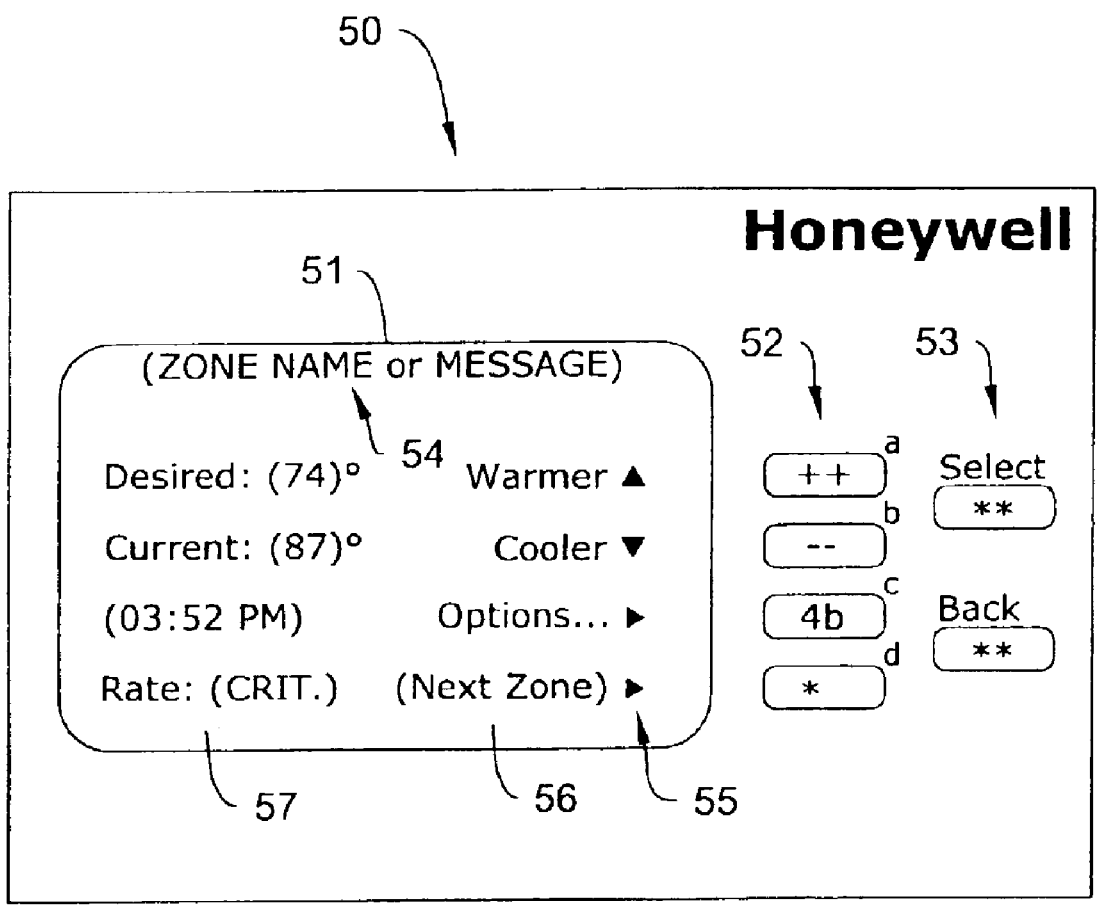
FIG. 4a is a model of the display used by a preferred embodiment of this invention.
Figure 4B:
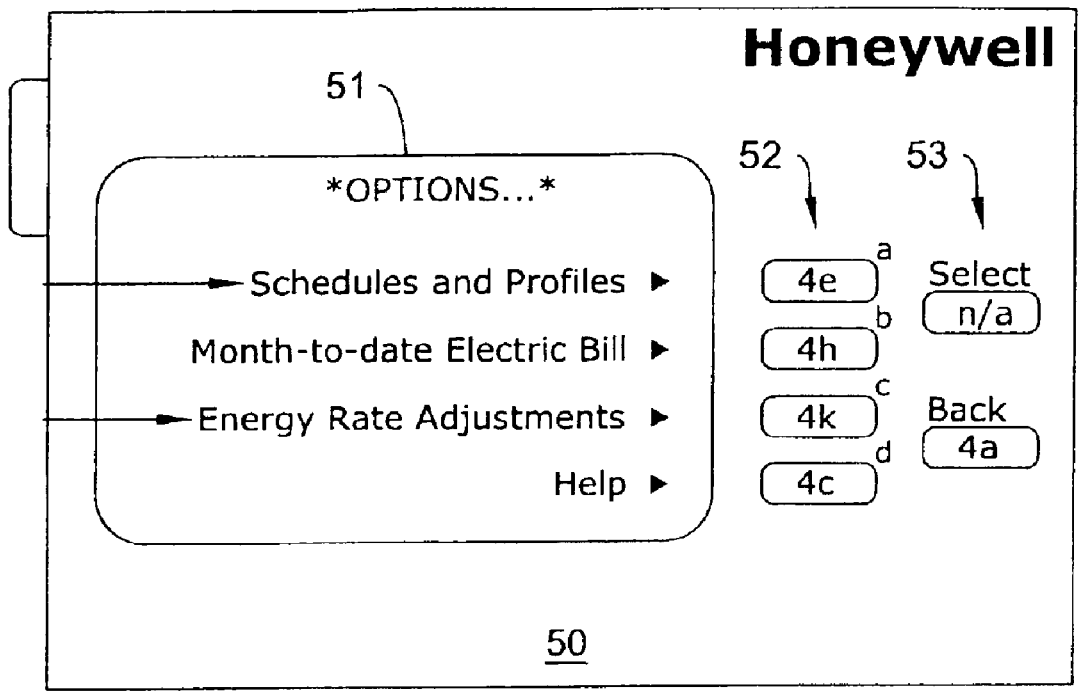
Figure 4C:
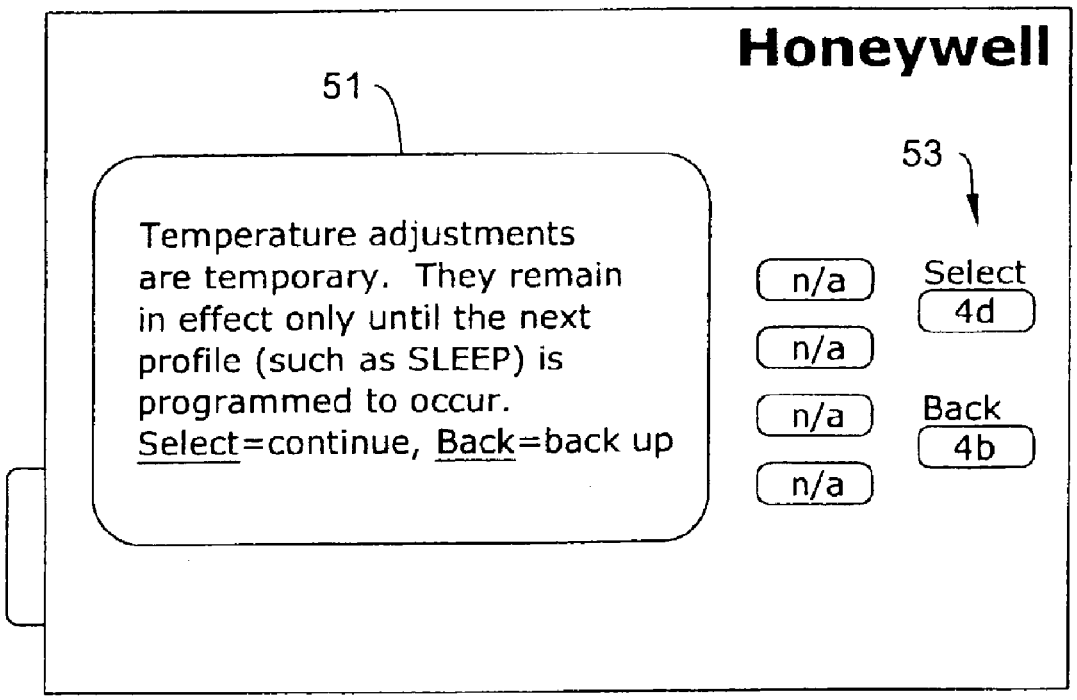
Figure 4D:
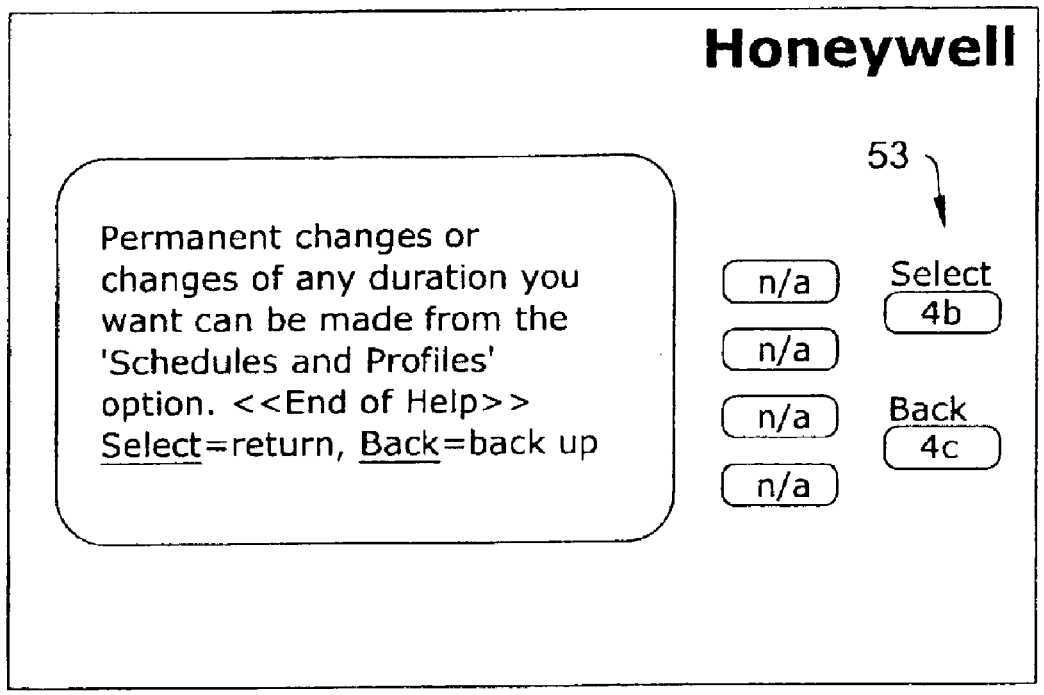
Figure 4E:
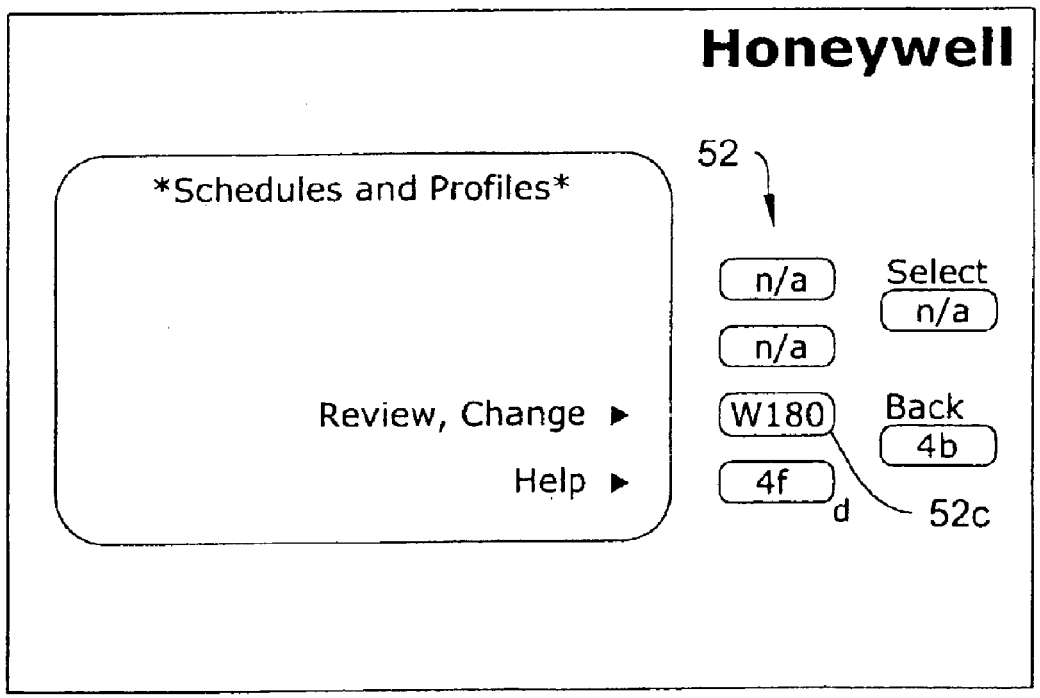
Figure 4F:
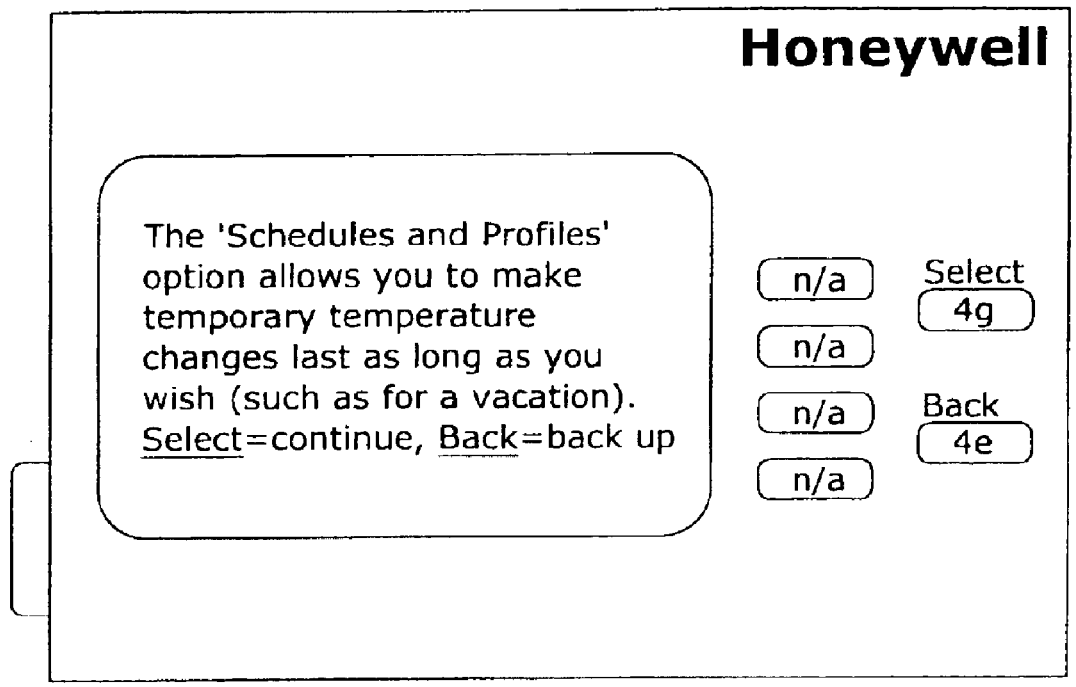
Figure 4G:
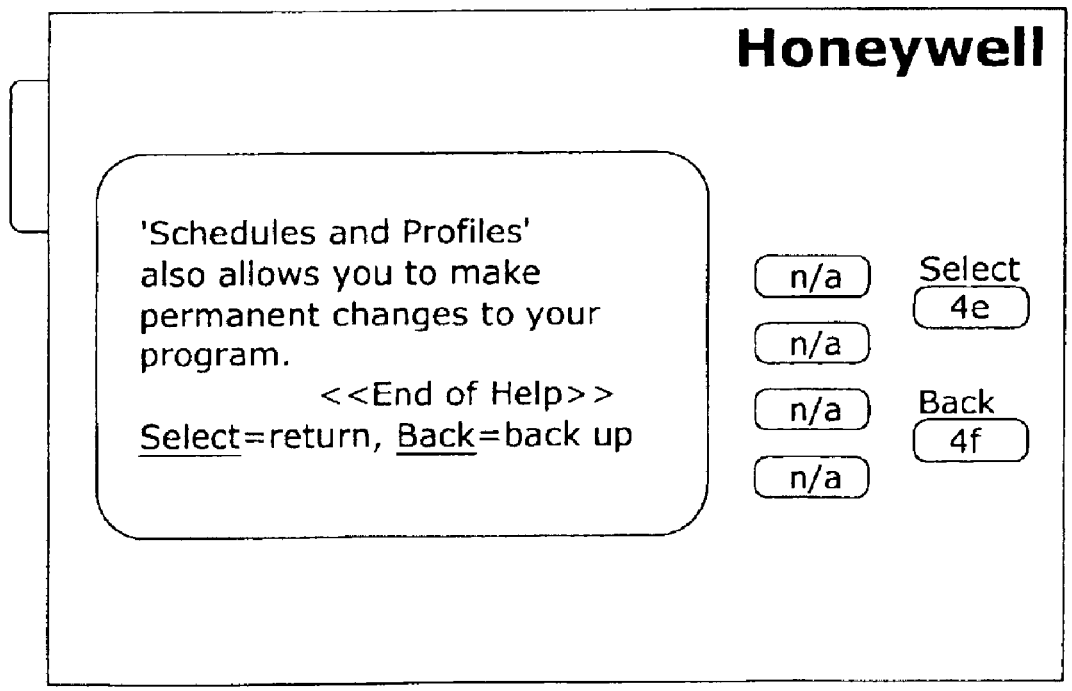
Figure 4H:
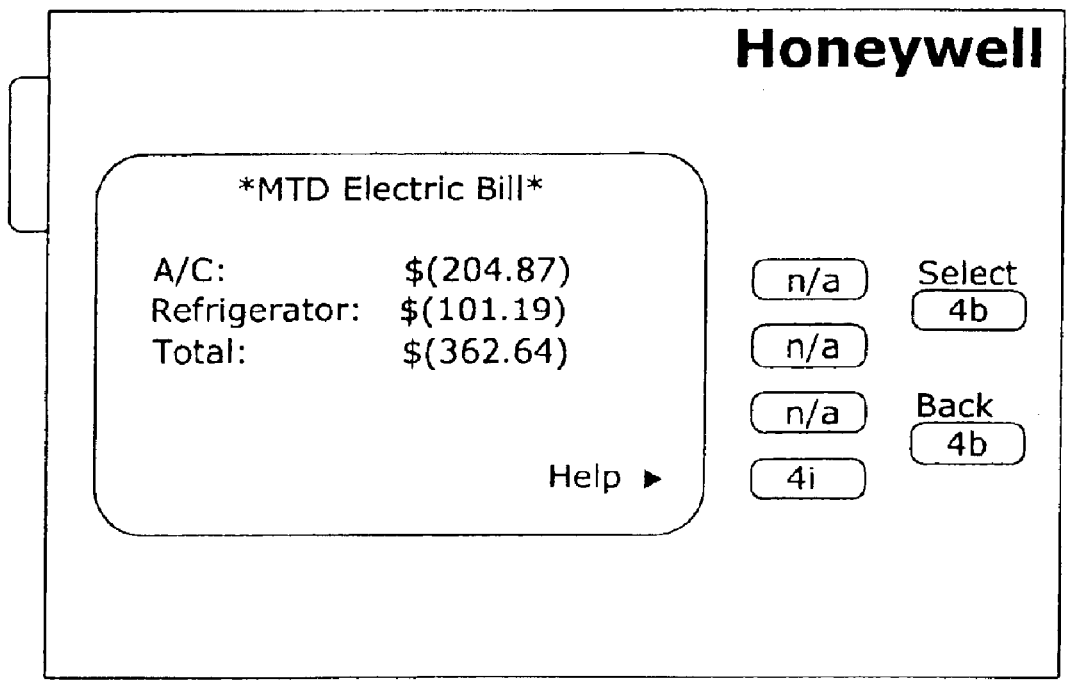
Figure 4I:
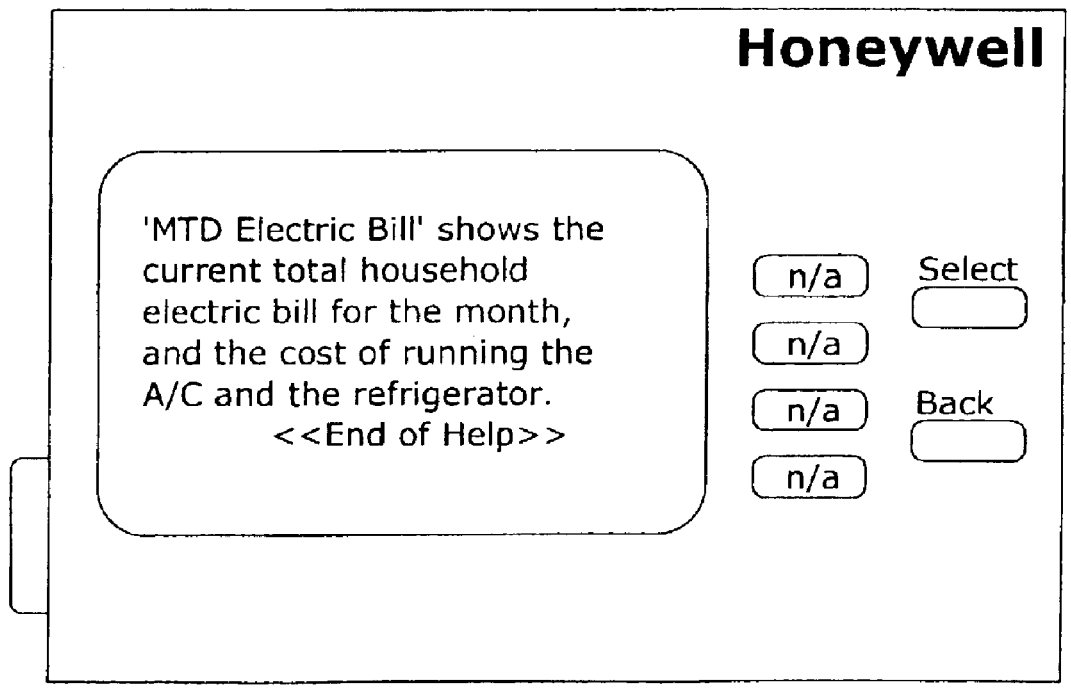
Figure 4K:
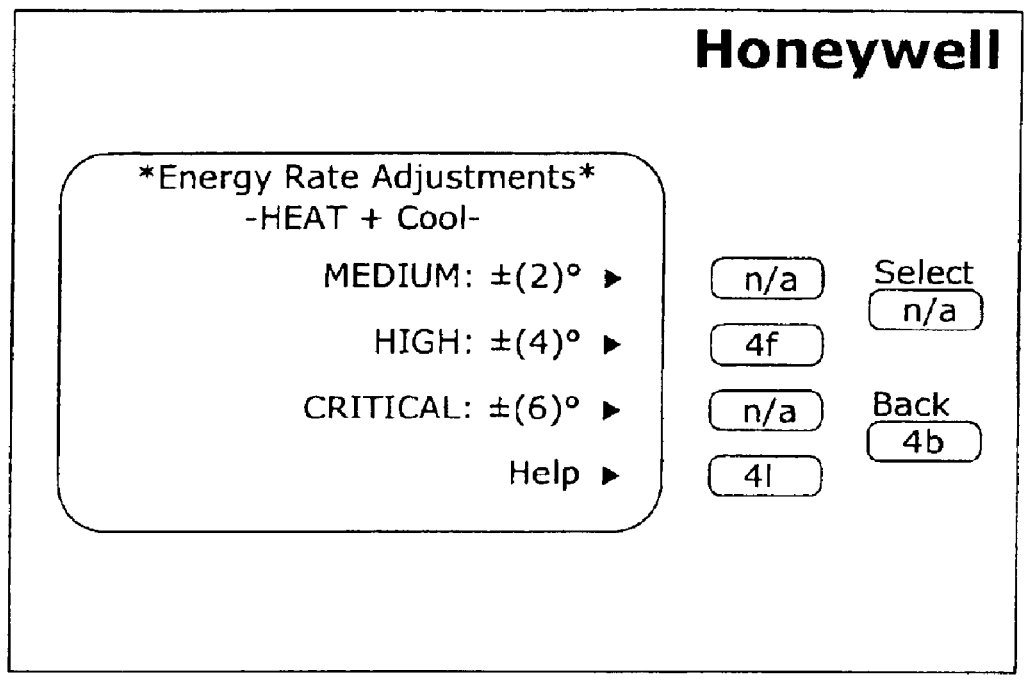
Figure 4L:
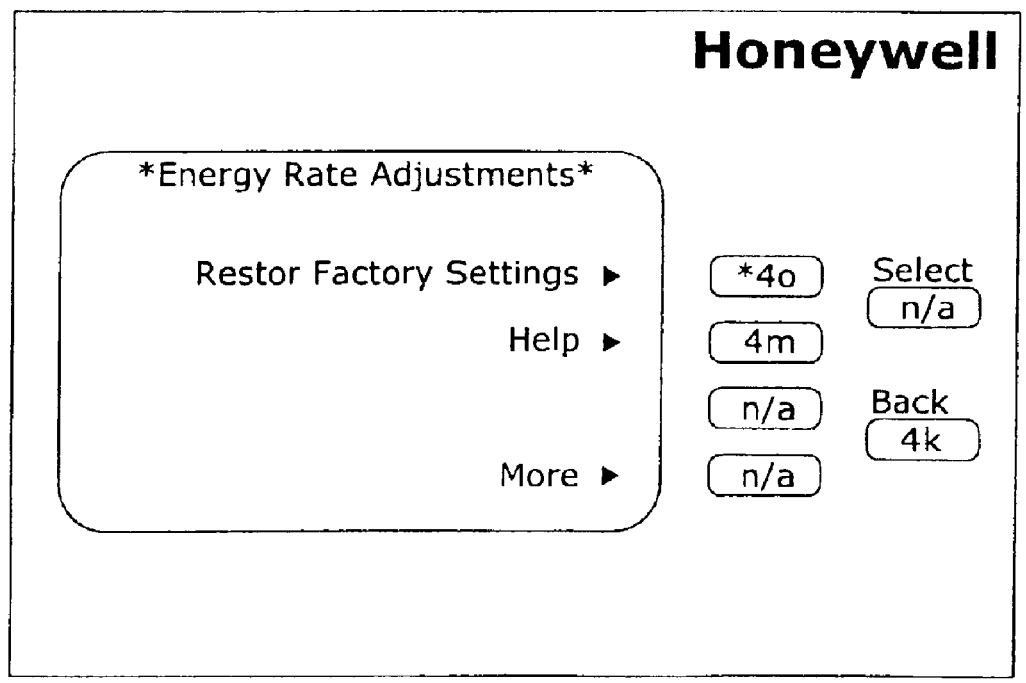
Figure 4M:
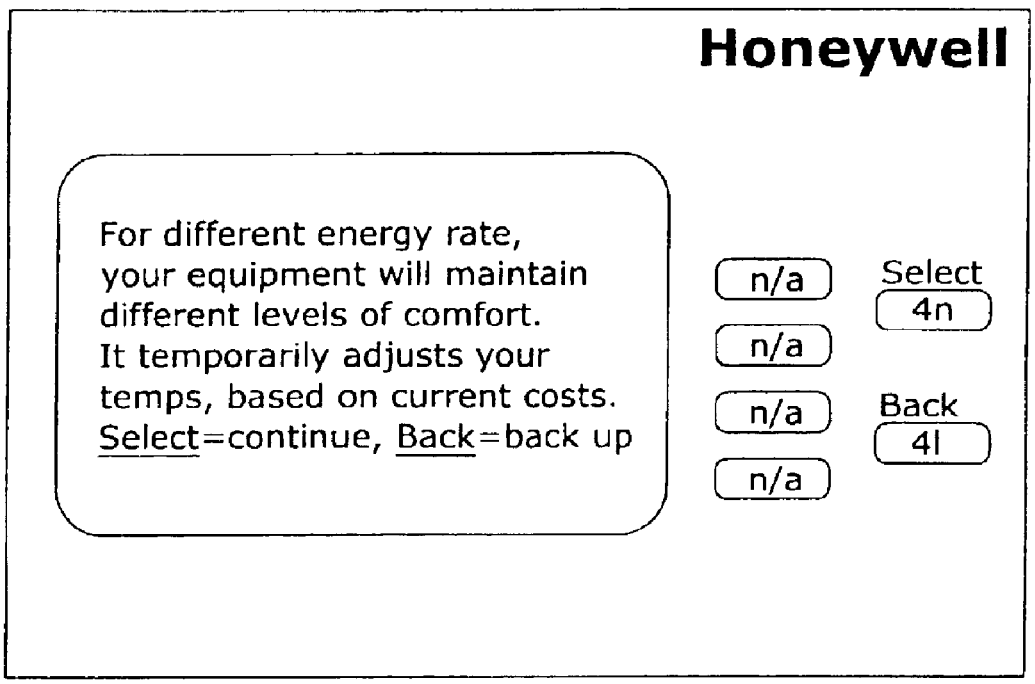
Figure 4N:
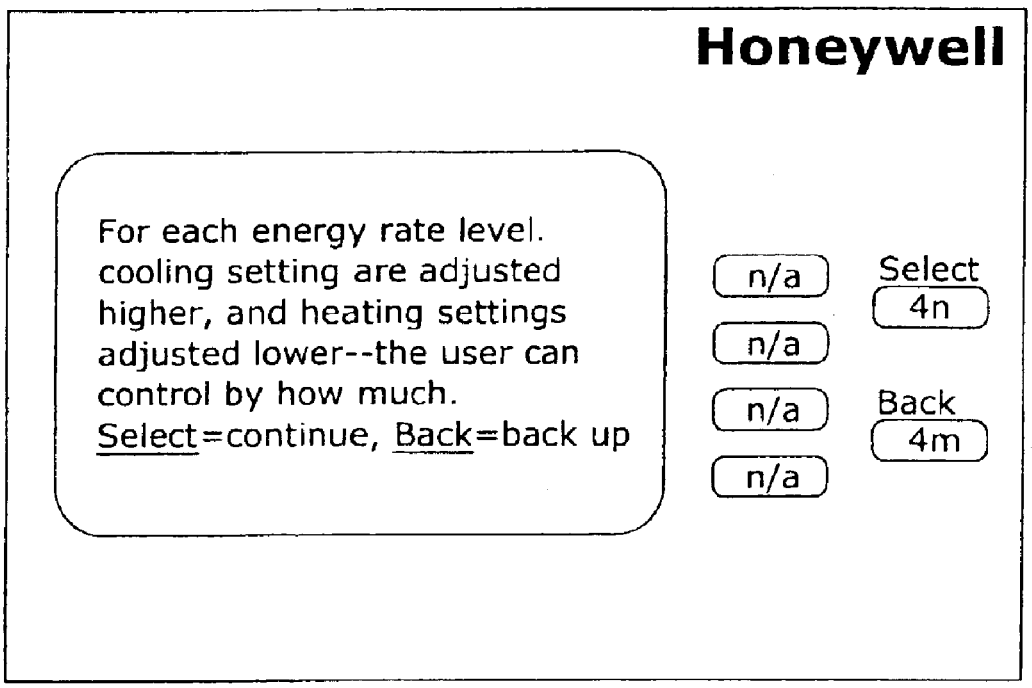
Figure 4O:
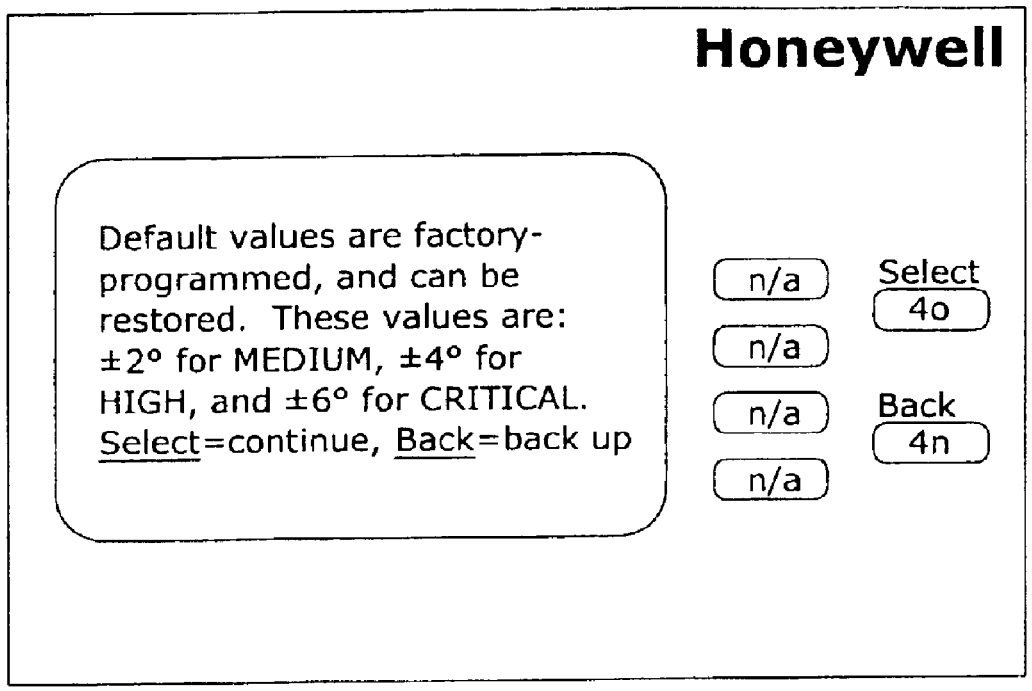
Figure 4P:
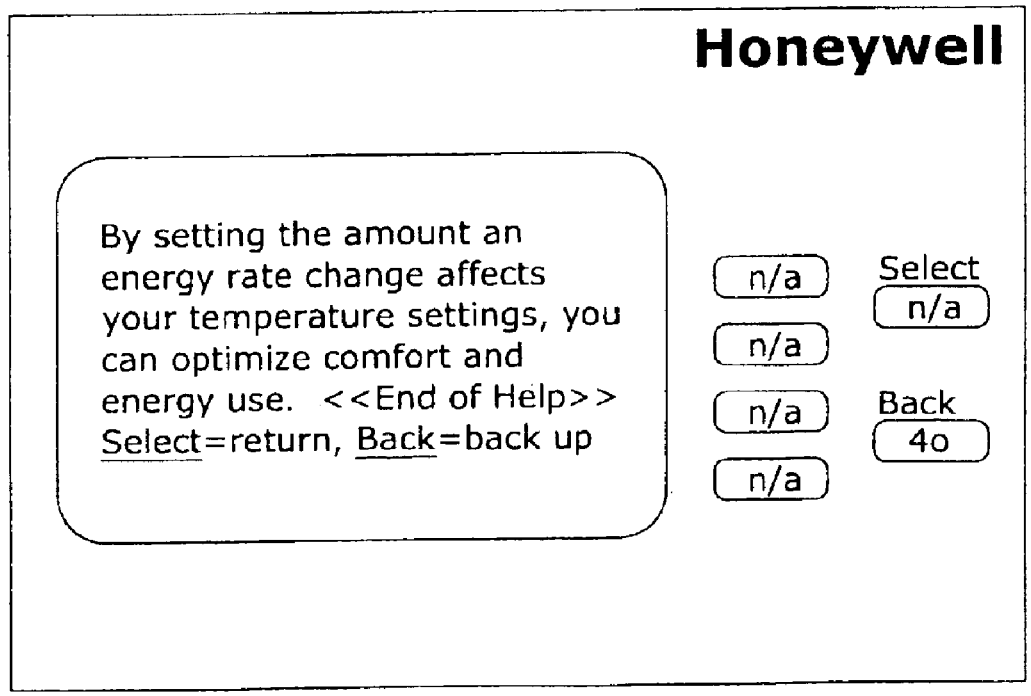
Figure 4Q:
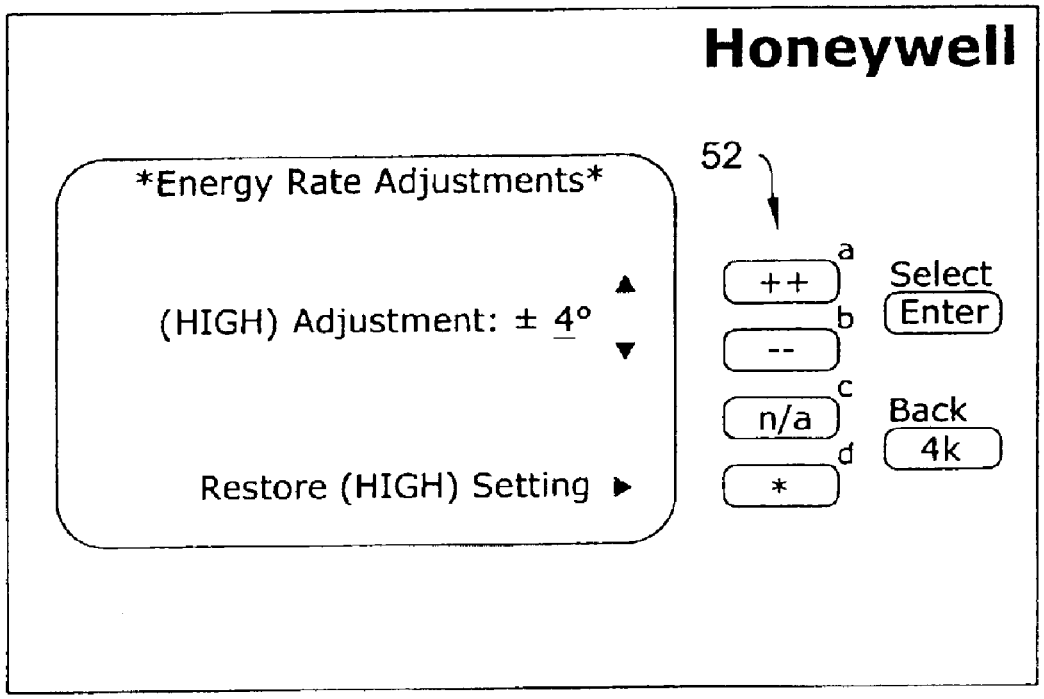
Figure 4R:
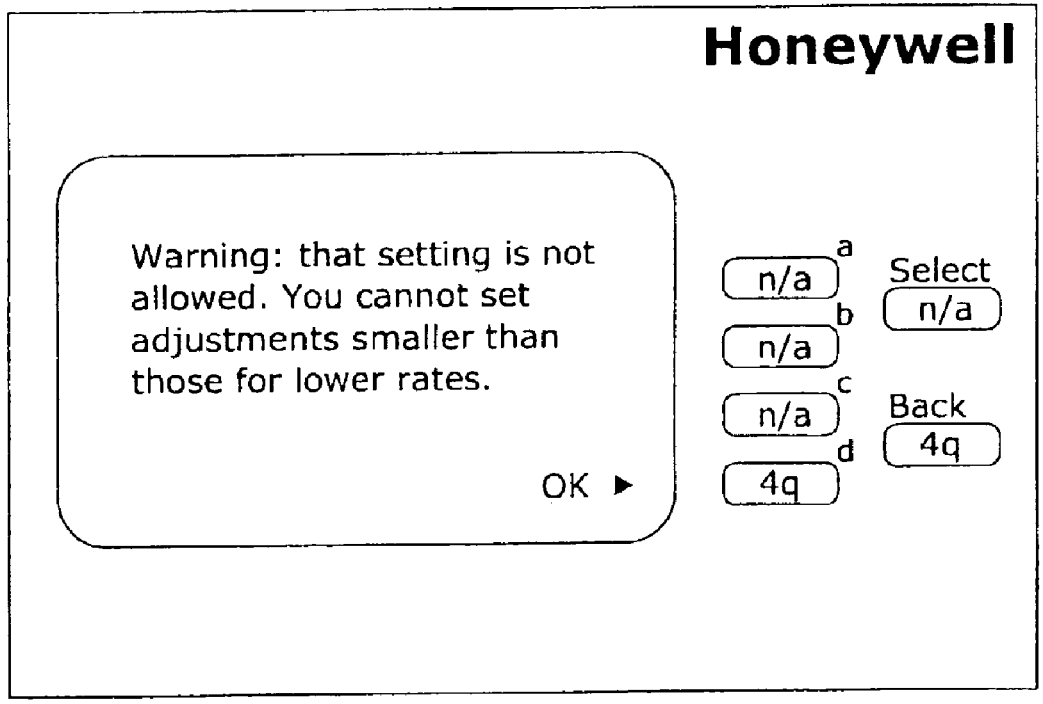

In the FIGS. 4*a–r*, a user interface panel 50 contains a display area 51, a set of four soft keys 52*a, b, c, d,* and two hard keys 53, Select and Back. Various configurations for data on the display 51 may be provided by other designers but in the preferred embodiment, arrows or other symbols 55 indicate the functions of the soft keys 52*a–d* by reference 56 associated with each such symbol 55. Where a display merely indicates information about the user's options, such as a help screen, a display configuration such as that shown in FIG. 4*c* may be provided in the preferred embodiments. In other cases, information 57 and a zone name or message 54 is preferably provided on the display 51 as in FIG. 4*a*. For ease of explanation, keys 52 and 53 contain information regarding their function which would not generally be available to the user. For example, in FIG. 4*a*, key 52*a* has two "+" signs indicating that the function of softkey 52*a* is to increase the amount of warmth, and key 52*b* has two "−" signs to show that the amount of warmth should be decreased and that the setpoint should be reduced. These "++" and "−−" keys will not be on the user touch pad but are included in these drawings to provide redundant information to the reader in order to facilitate the grasp of the inventive concepts of this document.

The use of softkeys allows the user to control the system without requiring a complicated or expensive user interface such as a general-purpose computer. However, general purpose computers or other interface devices may be used if desired. Also if desired, the utility may provide for the actuation of particular profiles within individual spaces or homes directly, but this would require such a utility to maintain an active database and provide a method by which the users could modify that database to their own desires on some kind of acceptable basis.

Other symbols drawn onto the keys such as in FIG. 4*b* indicate that a display is available at another level. N/A would indicate that that particular key cannot perform any function with this particular display. N/S indicates a feature not shown or described.

Starting with the display on panel 50, the user is provided with "options" to review schedules and profiles by selecting softkey 52*a* "month-to-date-electric bill" by 52*b*, "energy rate adjustments" by 52*c,* and "help" by key 52*d*. In this level the user may go back to the display of FIG. 4*a* by pressing the key 53 "back". No other options are available to the user from the panel as set up in FIG. 4*b*.

In FIG. 4*c,* a help screen would be the result of the user selecting softkey 52*d* in FIG. 4*b*. By selecting key 53 "select" the user would be moved to review the display of FIG. 4*d* which concludes the information available for this help function.

Moving on to FIG. 4*d* (the next level inward), the user would then select key 53 "back", leading him to the display illustrated in FIG. 4*e* to review the schedules and profiles. Another help screen is available by selecting key 52*d* at this stage, and a connection to the controller may be had by the user by selecting key 52*c*. FIGS. 4*f* and 4*g* show the help screens available from FIG. 4*e*. FIG. 4*h* shows an electric bill. FIG. 4*i* shows the user what this means. FIG. 4*k* shows the user what his energy rate adjustments are for heating and cooling, allows him to select more energy rate adjustments by pressing key 52*d,* or changing the adjustments for the heating and the cooling by selecting softkeys 52*a–c*. Only the "high" rate setting is shown in these figures.

In FIG. 4*l*, the user is allowed to go back to factory settings if desired. In FIGS. 4*m–p,* this is all explained (a "help" function).

By use of a simplified user interface such as the one described in these figures, user options may also be limited if desired, but they are not in the preferred embodiment. For example, in FIG. 4*q,* it can be seen how the user would adjust for the high adjustment for the option of FIG. 4*k*. In FIG. 4*r,* the user can be shown that he is trying to exercise control beyond the limits agreed to between himself and the utility. The display of FIG. 4*r,* in the preferred embodiment, will appear whenever the user attempts to go beyond his pre-agreed limits. This type of display may be used for other than profile out of bounds commands too. For example, the user may attempt to override a DLC signal at a time or for a load for which this is not permitted under the agreement with the utility. In such event a screen that says "direct control of this load is not permitted at this time" would be an appropriate form of message.

Having set out the various elements of the system and how the interface with the user should operate in a preferred embodiment of the invention and described how a multiplicity of alternative arrangements may also be preferred and within the scope of the present invention, a detailed descriptive of the interactive operation of the system should now be had.

Thus, for example, if at 12 midnight an electric utility were to pull substantial load generation capacity offline, say, for maintenance. It would then send out a "high price" signal over whatever communication pathway (FIG. 2) has been selected by the power company 20 to the utility interface to the customer's home, building, business or industrial facility (external interface, i.e., 13, FIGS. 1 and 1*a*). The controller 11 receives this information over bus 17 or directly from the external interface 13, whereupon controller 11 refers to the profiles (FIG. 5) stored in memory 14 (an internal part of controller 11 in FIG. 1A). The controller maintains a current status set of registers including a mode indicator and an active setpoint indicator. Using the mode indicator reference, the controller searches memory for the "high price" profile for each subsystem under its control. Thus, in zone 1, the offset of −3° Fahrenheit is provided to the subsystem controller for zone 1 with reference to the current active setpoint of 68° Fahrenheit. With reference to zone 2, no offset is provided and in reference to zone 3, an (−2°) offset is provided.

Alternatively, and in the most preferred embodiment, a very small profile set may be stored as in FIG. 5*a*. Here the 3° offset is applied to all units under control of the system for the "high price" signal.

A set of 16 drawings is included as an Appendix which supplies the presently most preferred embodiment of the Graphic User Interface first described in FIGS. 4*a* et seq.

The invention should not be considered limited, except as set forth in the following appended claims.

What is claimed is:

1. A method for controlling an environmental control system, wherein the environmental control system controls one or more environornmental conditions of an inside space of a user's facility/home/building in accordance with one or more setpoints, the method comprising the steps of:
   establishing communication with the environmental control system from a utility remote from the user's facility/home/building; and
   sending one or more setpoint commands from the utility, the one or more setpoint commands providing one or more setpoint indicators for use in determining the one or more setpoints that are to be used by the environmental control system.

2. A method according to claim 1 wherein the one or more setpoint indicators provided by the one or more setpoint commands are actual setpoints.

3. A method according to claim 1 wherein the one or more setpoint indicators provided by the one or more setpoint commands are setpoint offsets.

4. A method according to claim 1 wherein the environmental control system includes an interface, the interface helping to establish communication between the environmental control system and the utility.

5. A method according to claim 1 wherein communication is established at least partially over a power line.

6. A method according to claim 1 wherein communication is established at least partially over a telephone line.

7. A method according to claim 1 wherein communication is established at least partially over an RF link.

8. A method according to claim 1 wherein communication is established at least partially over a coaxial cable.

9. A controller for an environmental control system serviced by a utility having a load that includes a higher load period and a lower load period, wherein the controller accesses one or more setpoints and controls the environmental control system such that one or more environmental conditions of an inside space of a user's facility/home/building are maintained in accordance with the one or more setpoints, the controller comprising:
   a communications unit adapted to receive one or more setpoint commands from a location that is remote from the user's facility/home/building, the one or more setpoint commands providing one or more setpoint indicators for use in determining one or more new setpoints that are to be used by the environmental control system, wherein the one or more setpoint commands are selected to help reduce the load on the utility during a higher load period; and
   a controller for accessing the one or more setpoint indicators and for controlling the environmental control system such that the one or more environmental conditions of the inside space of the user's facility/home/building are maintained in accordance with the one or more new setpoints during a higher load period of the utility.

10. A controller according to claim 9 wherein the one or more setpoint indicators provided by the one or more setpoint commands are actual setpoints.

11. A controller according to claim 9 wherein the one or more setpoint indicators provided by the one or more setpoint commands are setpoint offsets.

12. A controller according to claim 9 wherein the location remote from the user's facility/home/building is a utility.

13. A method for controlling an environmental control system, wherein the environmental control system controls one or more environmental conditions of an inside space of a user's facility/home/building using one or more setpoints and one or more offsets, the method comprising the steps of:
   establishing communication with the environmental control system from a location that is remote from the user's facility/home/building;
   sending one or more energy price related signals to the environmental control system: and
   sending one or more offset commands to the environmental control system, the one or more offset commands providing one or more offsets to the environmental control system, the environmental control system using the one or more offsets to calculate new setpoints in response to the one or more energy price related signals.

14. A method according to claim 13 wherein the location remote from the user's facility/home/building is a utility.

15. A controller for an environmental control system, wherein the controller accesses one or more setpoints and controls the environmental control system such that one or more environmental conditions of an inside space of a user's facility/home/building are maintained in accordance with the one or more setpoints, the environmental control system further receiving one or more energy price related signals from a utility, the controller comprising:
   a communications unit adapted to receive one or more offset commands from a location that is remote from the user's facility/home/building, the one or more offset commands providing one or more setpoint offsets, each corresponding to a energy price related signal; and
   a controller for receiving the one or more setpoint offsets, and for calculating one or more setpoints for the environmental control system using the one or more setpoint offsets and the one or more energy price related signals provided by the utility.

16. A controller according to claim 15 wherein the controller selects the one or more setpoint offsets that correspond to the energy price related signal received from the utility.

17. A method for controlling an environmental control system for a user's facility/home/building, the method comprising the steps of:
   storing one or more setpoint indicators at a location that is remote and separate from the user's facility/home/building,
   establishing communications with the environmental control system and providing at least selected setpoint indicators to the environmental control system; and
   operating the environmental control system to control one or more environmental conditions of an inside space of the user's facility/home/building in accordance with one or more setpoints, wherein the one or more setpoints are based on the selected setpoint indicators.

18. A method according to claim 17 wherein the one or more setpoint indicators are actual setpoints.

19. A method according to claim 17 wherein the one or more setpoint indicators are setpoint offsets.

20. A method according to claim 17 wherein the one or more setpoint indicators include both actual setpoints and setpoint offsets.

21. A method according to claim 17 wherein the one or more setpoint indicators are stored in a database.

22. A method according to claim 21 further comprising the step of allowing a user to change the one or more setpoint indicators stored in the database.

23. A method for controlling an environmental control system, wherein the environmental control system controls one or more environmental conditions of an inside space of a user's facility/home/building having two or more zones in accordance with one or more setpoints, the method comprising the steps of:

establishing communication with the environmental control system from a location that is remote and separate from the user's facility/home/building; and sending one or more setpoint commands from the remote location, the one or more setpoint commands providing one or more setpoint indicators for use in determining the one or more setpoints that are to be used by the environmental control system in each of the zones of the inside space.

24. A method according to claim 23 wherein the one or more setpoint indicators provided by the one or more setpoint commands are setpoints for at least two zones of the inside space.

25. A method according to claim 23 wherein the one or more setpoint indicators provided by the one or more setpoint commands are setpoint offsets for at least two zones of the inside space.

26. A method according to claim 25 wherein each of the setpoint offsets corresponds to a particular energy price related level determined by a utility.

27. A method according to claim 23 wherein the location remote from the user's facility/home/building is a utility.

28. A controller for an environmental control system that has two or more zones, the controller comprising:

a communications unit adapted to receive one or more energy price related signals provided by a utility designating one or more energy price related levels; and a controller for controlling the environmental control system such that one or more environmental conditions in each zone are maintained in accordance with one or more setpoints, wherein the one or more setpoints correspond to a designated energy price related level.

29. A controller according to claim 28 wherein the controller includes a memory for storing one or more setpoint profiles for each zone, at least one setpoint profile for each of at least two zones designating at least one setpoint for each of at least two energy price related levels.

30. A controller according to claim 28 wherein the one or more setpoints for each zone that correspond to a designated energy price related level are different for at least two zones.

31. A controller for an environmental control system that has two or more zones, the controller comprising:

a communications unit adapted to receive one or more energy price related signals provided by a utility designating one or more energy price related levels;

a memory for storing one or more setpoint profiles for each zone, at least one setpoint profile for two or more zones including at least one offset for each of at least two energy price related levels; and a controller for controlling the environmental control system such that one or more environmental conditions in each zone are maintained in accordance with the corresponding one or more setpoints, as well as the corresponding at least one offset for the designated energy price related level.

32. A controller for controlling two or more appliances in a user's facility/home/building, the controller receiving one or more energy price related signals from a utility that select one of at least two different energy price related levels, the controller comprising:

a communications unit adapted to receive the one or more energy price related signals provided by the utility; and a memory for storing one or more setpoint profiles for each appliance, at least one setpoint profile for selected appliances including at least one offset for each of at least two energy price related levels; and a controller for controlling the two or more appliances such that each appliance is maintained in accordance with the corresponding one or more setpoints, as well as the corresponding at least one offset for the currently designated energy price related level.

33. A controller according to claim 32 wherein at least one of the appliances is an environmental control system.

34. A controller according to claim 32 wherein at least one of the appliances is a water heater.

35. A method for controlling a control system, wherein the control system controls one or more conditions in accordance with one or more setpoints, the method comprising the steps of:

providing one or more offsets, wherein each offset corresponds to a energy price related level designated by a utility;

selecting an offset that corresponds to a current energy price related level; and changing the one or more setpoints used by the control system based on the selected offset.

36. A method according to claim 35 wherein the one or more setpoints are changed in response to a change in the energy price related level.

37. A method according to claim 35 wherein the one or more setpoints are user-defined.

38. A method according to claim 35 wherein the one or more offsets are user defined.

39. A method according to claim 35 wherein the one or more setpoints are at least partially utility-defined.

40. A method according to claim 35 wherein the one or more offsets are at least partially utility-defined.

* * * * *